Patented Nov. 5, 1929

1,734,034

UNITED STATES PATENT OFFICE

ARNOLD WILLIAM GREGORY, DECEASED, LATE OF GREENWICH, LONDON, ENGLAND, BY MARGARET ADA GREGORY, OF GREENWICH, LONDON, ENGLAND, EXECUTRIX

PROCESS FOR THE TREATMENT OF ORES FOR THE RECOVERY OF TITANIUM

No Drawing. Application filed October 16, 1926, Serial No. 142,150, and in Great Britain October 20, 1925.

This invention relates to an improved process for the recovery of titanium, and refers to the known process in which an ore is treated with an acid in order to resolve it into its constituents or to separate the ingredients either wholly or partially.

In the case of ores, such as ilmenite, a mineral containing large percentage of ferrous titanate, the direct treatment with any of the common acids, either concentrated or in the diluted state, is ineffective.

According to the present invention the ore is given a preliminary treatment under which the iron is reduced to the metallic state in a finely divided form at a comparatively low temperature. Practically the whole of the iron can then be dissolved out by the aid of a dilute acid, such as 2% sulphuric acid.

The titanium residues is obtained in a form in which it can be easily treated for recovery.

The finely powdered ore, ilmenite for example, is mixed with such a percentage of carbon as will reduce the iron present from the state of oxide to the metal and also with a quantity of a fusible alkaline salt such as sodium carbonate. The mixture is then heated to a state of bright redness in a closed vessel to prevent access of air, or in a reducing or neutral atmosphere. The resulting mass, which is pulverulent or lightly fritted together, may then be treated with 2% sulphuric acid. This removes practically the whole of the iron, ferrous sulphate being formed.

The residue contains nearly all the titanium and may be further treated for the recovery of titanium or for the production of of titanium oxide by known means.

The process is capable of application generally in the treatment of ores containing titanium where the iron may be separated from the main or valuable constituents by treatment with acids.

As an illustration of the practical application of the invention the following is given as applied to the treatment of ilmenite.

A sample of this mineral, which was found to contain approximately 50% of iron oxide and about 40% of titanium oxide, was mixed with powdered coal and soda ash in the following proportions:—

| | Parts |
|---|---|
| Ilmenite | 100 |
| Powdered coal | 20 |
| Soda ash | 20 |

This was heated in a closed chamber to bright redness for at least one hour. It was then treated with enough 2% sulphuric acid to neutralize the soda and form, with the iron, ferrous sulphate, and a slight excess to render the liquid faintly acid. The whole was then raised to, and maintained at, the boiling point for one hour when practically all the iron was found in the solution and practically all the titanium in the residue.

Whilst, as aforesaid, it has been found that acids so weak as 2% sulphuric are quite satisfactory for the purpose of extracting the iron, it will be understood that the strength of the acid may be varied as desired.

Claim:

That process of removing the iron from titanic iron ores which consists in pulverizing the ore, mixing the pulverized ore with sufficient free carbon to combine with substantially all of the oxygen in the iron oxide of the ore and with a fusible alkaline salt, heating the mixture in the absence of free oxygen to a bright red heat to cause combination of the carbon with substantially all of the oxygen of the iron oxide content and production of free iron in a dispersed state, and immediately treating the whole mass with dilute acid capable of combining with the free iron in quantity at least sufficient to combine with all said free iron, and to neutralize the alkaline salt whereby to resolve all the iron content of the ore to an iron salt in solution.

In testimony whereof I have hereunto set my hand.

MARGARET ADA GREGORY,
Administratrix of Arnold William Gregory, Deceased.